US012732515B2

(12) United States Patent
Jeyakumar et al.

(10) Patent No.: US 12,732,515 B2
(45) Date of Patent: Sep. 8, 2026

(54) CROSS-PLATFORM SECURITY THREAT DETECTION

(71) Applicant: Abnormal AI, Inc., Las Vegas, NV (US)

(72) Inventors: Sanjay Jeyakumar, El Cerrito, CA (US); Abhijit Bagri, Atlanta, GA (US); Tejas Khot, Long Island City, NY (US); Cheng-Lin Yeh, San Mateo, CA (US); Yingkai Gao, Brooklyn, NY (US)

(73) Assignee: Abnormal AI, Inc., Las Vegas, NV (US)

( * ) Notice: Subject to any disclaimer, the term of this patent is extended or adjusted under 35 U.S.C. 154(b) by 38 days.

(21) Appl. No.: 18/654,753

(22) Filed: May 3, 2024

(65) Prior Publication Data

US 2025/0343804 A1 Nov. 6, 2025

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC ........................ H04L 63/1416; H04L 63/1425
See application file for complete search history.

(56) References Cited

U.S. PATENT DOCUMENTS 11,972,427 B2 * 4/2024 Zevetchin .......... G06Q 20/4014
2010/0024033 A1 * 1/2010 Kang .................. H04L 63/1466 726/23
2014/0372526 A1 12/2014 Zaveri
2017/0279824 A1 9/2017 Haugsnes
2018/0004948 A1 1/2018 Martin
2019/0132328 A1 * 5/2019 Sims ...................... G06N 20/00
2019/0132787 A1 * 5/2019 Ryan ..................... H04W 12/12
2021/0273976 A1 9/2021 Reiser
2021/0360027 A1 11/2021 Boyer
2022/0286432 A1 9/2022 Chechik
2022/0358212 A1 * 11/2022 Dixit .................... G06N 3/0895
2022/0377093 A1 11/2022 Crabtree
2023/0239303 A1 7/2023 Hutelmyer
2024/0056405 A1 * 2/2024 Wilson .................. H04L 51/046
2024/0155007 A1 5/2024 Gasiorek

* cited by examiner

*Primary Examiner* — Brian Whipple
(74) *Attorney, Agent, or Firm* — Van Pelt, Yi & James LLP

(57) ABSTRACT

In various embodiments, a process for cross-platform security threat detection includes determining that a specific event in a plurality of events from a plurality of different digital service platforms meets a criterion for multievent analysis. The process includes identifying, among the plurality of events, a group of cross-platform events related to the specific event; and analyzing at least the group of cross-platform events to detect a potential security threat. The process includes providing a security threat analysis result associated with the identified group of cross-platform events.

20 Claims, 13 Drawing Sheets

Employee Details

Rachel Maguire
Employee

Email rmaguire@starwood.com
Office Unknown

Employee Genome Identity Breakdown

Common States

| | |
|---|---|
| Illinois | 100.00% |

Common Cities

| | |
|---|---|
| Chicago | 25.71% |
| Naperville | 20.00% |
| Glencoe | 20.00% |
| Lisle | 20.00% |
| Buffalo Grove | 5.71% |

Show More

Common Countries

| | |
|---|---|
| United States | 100.00% |

Common Operating Systems

| | |
|---|---|
| Windows 10.0.0 | 88.89% |
| iOS ?.?.?.? | 11.11% |

Common Browsers

| | |
|---|---|
| Chrome 102.0.5005 | 63.89% |
| Mobile Safari 17.3.1 | 8.33% |
| Chrome 122.0.0 | 8.33% |
| Chrome 123.0.0 | 8.33% |
| Edge 18.19045.0 | 5.56% |

Show More

Common IP Addresses

FIG. 10

Employee Details

Rachel Maguire
Employee

| | |
|---|---|
| Email | rmaguire@starwood.com |
| Office | Unknown |

Employee Genome Identity Breakdown

Common States

| | |
|---|---|
| Illinois | 100.00% |

Common Cities

| | |
|---|---|
| Chicago | 25.71% |
| Naperville | 20.00% |
| Glencoe | 20.00% |
| Lisle | 20.00% |
| Buffalo Grove | 5.71% |

Show More

Common Countries

| | |
|---|---|
| United States | 100.00% |

Common Operating Systems

| | |
|---|---|
| Windows 10.0.0 | 88.89% |
| iOS ?.?.?.? | 11.11% |

Common Browsers

| | |
|---|---|
| Chrome 102.0.5005 | 63.89% |
| Mobile Safari 17.3.1 | 8.33% |
| Chrome 122.0.0 | 8.33% |
| Chrome 123.0.0 | 8.33% |
| Edge 18.19045.0 | 5.56% |

Show More

Common IP Addresses

| | |
|---|---|
| 73.73.65.156 | 31.43% |
| 38.104.181.190 | 22.86% |
| 12.74.213.28 | 11.43% |
| 2600:387:F:761B::6 | 5.71% |
| 166.205.124.143 | 5.71% |

FIG. 11 (Cont.)

CROSS-PLATFORM SECURITY THREAT DETECTION

BACKGROUND OF THE INVENTION

With the growing availability of various technological tools, enterprises (also referred to as "businesses," "companies," "organizations," or more generally "entities") may use several platforms that support various digital activities. Examples of platforms include email (such as Microsoft Office 365® and Google Workspace™), messaging (such as Slack®, Zoom®, and Cisco Webex®), cloud infrastructure (e.g., Google Cloud Platform™, Amazon Web Services®, and Microsoft Azure®), cloud office (e.g., Microsoft Office 365 and Google Workspace), and Software-as-a-Service ("SaaS") (also called "Platform-as-a-Service platforms" or "PaaS platforms") like those operated by Salesforce®, Workday®, Oracle®, etc. The platforms may be susceptible to security threats (such as social engineering attacks including phishing, pretexting, and fraud) by malicious actors (also referred to as "attackers").

Conventional defense mechanisms are typically designed to be platform specific and are largely ineffective against novel threats. Such an approach to developing new defense mechanisms in a siloed manner may be insufficient for preventing attacks. For example, attackers can take advantage of the "gaps" between the various platforms that might be used by employees of an enterprise. Thus, there is a need for improved security threat detection.

BRIEF DESCRIPTION OF THE DRAWINGS

Various embodiments of the invention are disclosed in the following detailed description and the accompanying drawings.

FIG. 10 illustrates an example of a user interface including a user profile associated with a security threat analysis result obtained in some embodiments.

DETAILED DESCRIPTION

Figure 1:
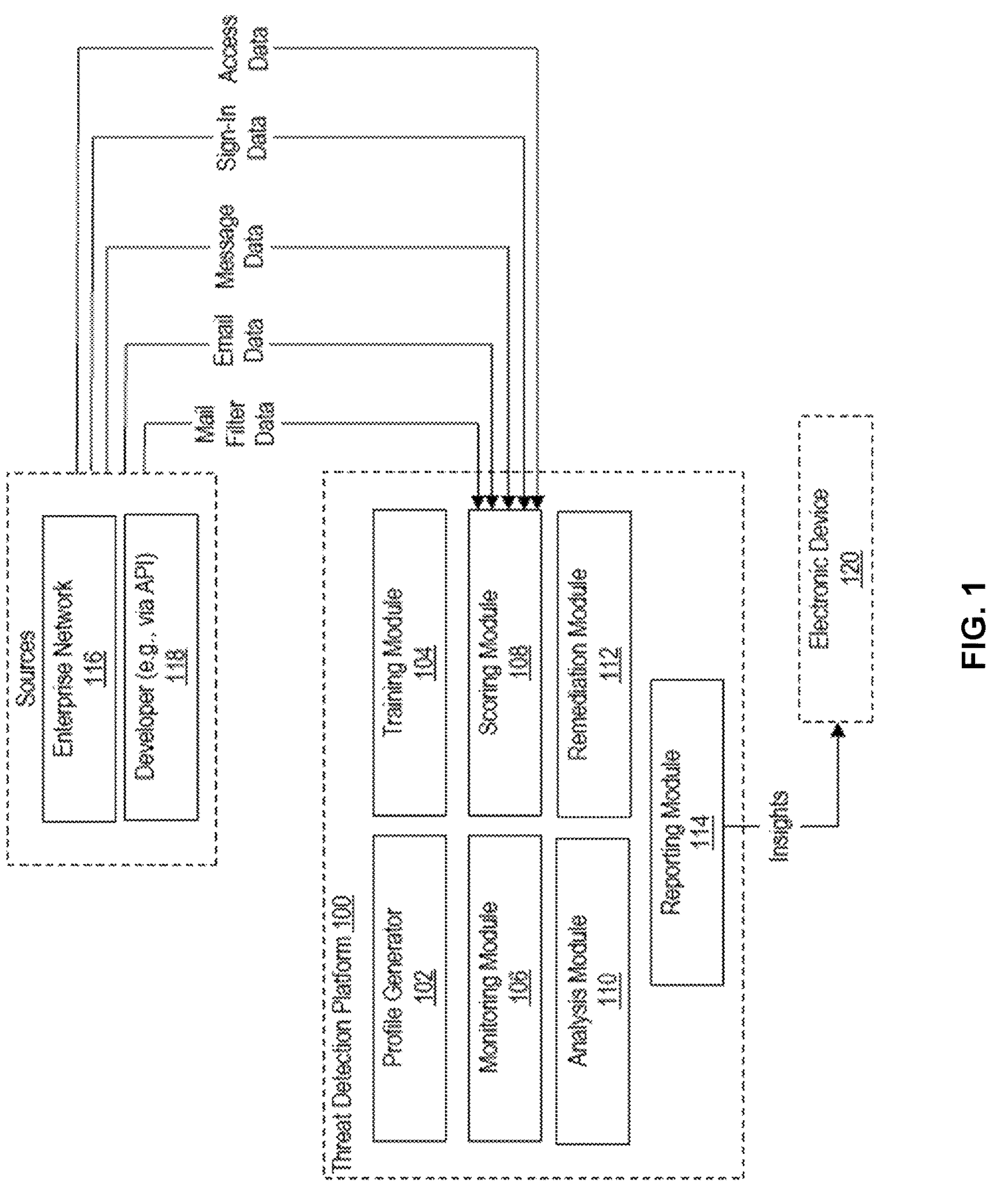
FIG. 1 is a block diagram illustrating an embodiment of a system for security threat detection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The disclosed techniques provide security threat detection using independent abnormality analysis and risk analysis. In various embodiments, data is ingested and processed to determine insights on whether there is an attack or other type of security threat or event. Upon receiving data from various platforms, the data is standardized into one or more common formats. The data is then enriched with various additional information such as user-level data, network data, behavioral aggregates, or internal/external threat intelligence data. An enriched event may be analyzed to determine a risk score and/or anomaly score. The initial analysis may be based on the event alone. If the risk score and/or anomaly score is above a threshold, secondary analysis may be performed.

The disclosed techniques provide cross-platform security threat detection. The secondary analysis may include using machine learning to identify potential security threats. Unlike the initial single-event analysis, the secondary analysis includes multi-event analysis, which involves multiple events obtained from one or more platforms. For example, the secondary analysis described herein includes identifying a group of cross-platform related events, detecting a potential security threat based on the group, and displaying the result on a user interface.

As further described herein, a security threat detection platform may ingest data from various platforms and then apply, to the data, rules, heuristics, or models that are designed to determine whether events represented in the data are unusual. In some instances, a singular event may be sufficiently unusual so as to be flagged as evidence of a threat. Consider, for example, a scenario where a sign-in activity for an account occurs in a country in which the employee is known or presumed to not be located. In other instances, multiple events—each of which is slightly or mildly unusual—are sufficiently unusual when viewed together so as to be flagged as evidence of a threat.

Surfacing these "multi-event behavioral indicators" is not a trivial task, as the threat detection platform not only has to separately gauge the risk of each event but also collectively gauge the risk of the multiple events in combination—even if those events occur across different platforms. By documenting unusual events occurring across different services in a temporal manner, the threat detection platform can generate an abnormal behavioral case timeline (also called the "abnormal behavior case timeline" or simply "ABC timeline"). At a high level, the ABC timeline is representative of a multi-event "snapshot" of behavior that allows attacks to be more easily detected.

Together, multiple unusual events in the ABC timeline may define a "case" that exhibits characteristics of an attack. Generally, the core components include (i) a primary entity, (ii) a series of notable events, and (iii) a judgment (and in some embodiments, a prediction of attack type and/or a prediction of attack severity). Generally, the primary entity is either a person or document, depending on the type of event (and therefore, the nature of the platform from which the data representing the event is acquired). However, the primary entity could be another type of object or even a piece of information. For example, if an event is representative of a transmission or receipt of a communication, then the primary entity may be the person that is associated with the account that transmitted or received the communication. As another example, if an event is representative of a sign-in activity for a platform through which information is accessed, then the primary entity may be the information. Meanwhile, the series of notable events may include any events involving the primary entity that have been determined to be unusual. Events that have been deemed normal may be discarded by the threat detection platform, and therefore not recorded in the ABC timeline.

The ABC timeline allows the threat detection platform to use its core infrastructure, as discussed below with reference to FIGS. 1-2, across different use cases (e.g., from business email compromise to internal phishing to account takeover), across different platforms (e.g., from communication platforms to non-communication platforms), etc.

FIG. 1 is a block diagram illustrating an embodiment of a system for security threat detection. In various embodiments, this system is a threat detection platform that examines the digital conduct of accounts associated with employees to detect threats to the security of an enterprise. As shown here, the threat detection platform 100 may include a profile generator 102, a training module 104, a monitoring module 106, a scoring module 108, an analysis module 110, a remediation module 112, and a reporting module 114. Some embodiments of the threat detection platform 100 include a subset of these components, while other embodiments of the threat detection platform 100 include additional components that are not shown in FIG. 1.

At a high level, the threat detection platform 100 can acquire data related to digital conduct of accounts associated with employees and then determine, based on an analysis of the data, how to handle security threats in a targeted manner. Some data may be acquired from an enterprise network 116, while other data may be acquired from a developer 118 of a platform, for example, via an application programming interface ("API"). As shown in FIG. 1, the data may include information related to emails, messages, mail filters, sign-in activities, access activities, and the like. As further discussed below, these data are not necessarily obtained from the same source. As an example, data related to emails may be acquired from an email service (e.g., Microsoft Exchange™) while data related to messages may be acquired from a messaging service (e.g., Slack®).

The threat detection platform 100 can be implemented, partially or entirely, within an enterprise network 116, a remote computing environment (e.g., through which the data regarding digital conduct is routed for analysis), a gateway, or another suitable location. The remote computing environment can belong to, or be managed by, the enterprise or another entity. In some embodiments, the threat detection platform 100 is integrated into the enterprise's email system (e.g., at the gateway) as part of an inline deployment. In other embodiments, the threat detection platform 100 is integrated into the enterprise's email system via an API such as the Microsoft Outlook® API. In such embodiments, the threat detection platform 100 may obtain data via the API. Thus, the threat detection platform 100 can supplement and/or supplant other security products employed by the enterprise.

In a first variation, the threat detection platform 100 is maintained by a threat service (also referred to as a "security service") that has access to multiple enterprises' data. In this variation, the threat detection platform 100 can route data that is, for example, related to incoming emails to a computing environment managed by the security service. The computing environment may be an instance on Amazon Web Services®. The threat detection platform 100 may maintain one or more databases for each enterprise that include, for example, organizational charts, attribute baselines, communication patterns, and the like. Additionally or alternatively, the threat detection platform 100 may maintain federated databases that are shared amongst multiple entities. Examples of federated databases include databases specifying vendors and/or individuals who have been deemed fraudulent, domains from which incoming emails determined to be malicious originated, and the like. The security service may maintain different instances of the threat detection platform 100 for different enterprises, or the security service may maintain a single instance of the threat detection platform 100 for multiple enterprises. The data hosted in these instances can be obfuscated, encrypted, hashed, depersonalized (e.g., by removing personal identifying information), or otherwise secured or secreted. Accordingly, each instance of the threat detection platform 100 may only be able to access and then process data related to the accounts associated with the corresponding enterprise(s).

In a second variation, the threat detection platform 100 is maintained by the enterprise whose accounts are being monitored—either remotely or on premises. In this variation, all relevant data may be hosted by the enterprise itself, and any information to be shared across multiple enterprises can be transmitted to a computing system that is maintained by the security service or a third party.

As shown in FIG. 1, the profile generator 102, training module 104, monitoring module 106, scoring module 108, analysis module 110, remediation module 112, and reporting module 114 can be integral parts of the threat detection platform 100. Alternatively, these components could be implemented individually while operating "alongside" the threat detection platform 100. For example, the reporting module 114 may be implemented in a remote computing environment to which the threat detection platform 100 is communicatively connected across a network. As mentioned above, the threat detection platform 100 may be implemented by a security service on behalf of an enterprise or the enterprise itself. In some embodiments, aspects of the threat detection platform 100 are accessible or interactable via a web-accessible computer program operating on a computer server or a distributed computing system. For example, an individual may be able to interface with the threat detection platform 100 through a web browser that is executing on an electronic computing device (also called an "electronic device" or "computing device").

The enterprise network 116 may be a mobile network, wired network, wireless network, or some other communication network maintained by the enterprise or an operator on behalf of the enterprise. As noted above, the enterprise may utilize a security service to examine events to discover potential security threats. For example, the enterprise may grant permission to the security service to monitor the enterprise network 116 by examining emails (e.g., incoming emails or outgoing emails) and then addressing those emails that represent security threats. The threat detection platform 100 may be permitted to remediate the threats posed by those emails, or the threat detection platform 100 may be permitted to surface notifications regarding the threats posed by those emails. In some embodiments, the enterprise further grants permission to the security service to obtain data regarding other digital activities involving the enterprise (and, more specifically, employees of the enterprise) in order to build a profile that specifies communication patterns, behavioral traits, normal context of emails, normal content of emails, etc. For example, the threat detection platform 100 may identify the filters that have been created and/or destroyed by each employee to infer whether any significant variations in behavior have occurred. As another example, the threat detection platform 100 may examine the emails or messages received by a given employee to establish the characteristics of normal communications (and thus be able to identify abnormal communications). As another example, the threat detection platform 100 may examine sign-in activities to establish characteristics (e.g., in terms of location, time, frequency) that can then be used to establish whether a single sign-in activity is unusual or a combination of sign-in activities is unusual.

The threat detection platform 100 may manage one or more databases in which data can be stored. Examples of such data include enterprise data (e.g., email data, message data, sign-in data, access data, and mail filter data), remediation policies, communication patterns, behavioral traits, and the like. The data stored in the database(s) may be determined by the threat detection platform 100 (e.g., learned from data available on the enterprise network 116 or available from the developer 118), provided by the enterprise, or retrieved from an external database (e.g., associated with LinkedIn®, Microsoft Office 365®, or Google Workspace™). The threat detection platform 100 may also store outputs produced by the various modules, including machine- and human-readable information regarding insights into threats and any remediation actions that were taken.

As shown in FIG. 1, the threat detection platform 100 may include a profile generator 102 that is responsible for generating one or more profiles for the enterprise. For example, the profile generator 102 may generate a separate profile for each account associated with an employee of the enterprise based on the sign-in data, message data, email data, or mail filter data. Additionally or alternatively, profiles may be generated for business groups, organizational groups, or the enterprise as a whole. Examining the data may enable the profile generator 102 to discover organizational information (e.g., employees, titles, and hierarchy), employee behavioral traits (e.g., based on historical emails, messages, and historical mail filters), normal content of incoming or outgoing emails, behavioral patterns (e.g., when each employee normally logs in), communication patterns (e.g., who each employee communicates with internally and externally, when each employee normally communicates), etc. This information can be populated into the profiles so that each profile can be used as a baseline for what constitutes normal activity by the corresponding account (or group of accounts).

A profile could include a number of behavioral traits associated with the corresponding account. The profile generator 102 may determine the behavioral traits based on the access data, sign-in data, message data, email data, mail filter data, and any other data that is obtained from the enterprise network 116, developer 118, or another source. For example, the email data may include information on the senders of past emails received by a given email account, content of those past emails, frequency of those past emails, temporal patterns of those past emails, topics of those past emails, geographical locations from which those past emails originated, formatting characteristics (e.g., usage of HTML, fonts, styles, etc.), and more. For the given email account, the profile generator 102 may attempt to build a profile that includes information regarding the other email accounts to which emails are commonly transmitted to or received from, normal content of incoming and outgoing emails, normal transmission times, normal transmission locations, and the like. Accordingly, the profile generator 102 may attempt to build a profile for each account that represents a model of normal behavior of the corresponding employee. As further discussed below, the profiles may be helpful in identifying digital activities (also called "events") that are unusual, and therefore may be indicative of a security threat.

The monitoring module 106 may be responsible for monitoring communications (e.g., messages and emails) handled by the enterprise network 116. These communications may include incoming emails (e.g., external and internal emails) received by accounts associated with employees of the enterprise, outgoing emails (e.g., external and internal emails) transmitted by those accounts, and messages exchanged between those accounts. In some embodiments, the monitoring module 106 is able to monitor incoming emails in near real time so that appropriate action can be taken if a malicious email is discovered. For example, if an incoming email is determined to be representative of a phishing attack (e.g., based on an output produced by the scoring module 108), the incoming email may be prevented from reaching its intended destination by the monitoring module 106 at least temporarily. In some embodiments, the monitoring module 106 is able to monitor communications only upon the threat detection platform 100 being granted permission by the enterprise (and thus given access to the enterprise network 116 or another source).

The scoring module 108 may be responsible for examining digital activities to determine the likelihood that a security threat exists. For example, the scoring module may perform functions associated with single-event analyzer 340. For example, the scoring module 108 may examine each incoming email to determine how its characteristics compare to past emails sent by the sender or received by the recipient. In such a scenario, the scoring module 108 may determine whether characteristics such as timing, formatting, and location of origination (e.g., in terms of sender email address or geographical location) match a pattern of past emails that have been determined to be non-malicious. For example, the scoring module 108 may determine that an email is likely malicious if the sender email address (support-xyz@gmail.com) differs from an email address (John.Doe@CompanyABC.com) that is known to be associated with the alleged sender (John Doe). As another example, the scoring module 108 may determine that an account may be compromised if the account performs a sign-in activity that is impossible or improbable given its most recent sign-in activity. As another example, the scoring module 108 may determine that an account may be compromised if the account performs an access event that is impossible or improbable given its most recent access event.

The scoring module 108 can make use of heuristics, rules, neural networks, or other trained machine learning ("ML") algorithms that rely on decision trees (e.g., gradient-boosted decision trees), logistic regression, or linear regression. Accordingly, the scoring module 108 may produce discrete outputs or continuous outputs, such as a probability metric (e.g., specifying the likelihood that an incoming email is malicious), a binary output (e.g., malicious or not malicious), or a classification (e.g., specifying the type of malicious email).

As mentioned above, the scoring module 108 may also consider combinations of digital activities—across the same platform or different platforms—to determine whether a security threat exists. This may be done in a "rolling" manner, where each digital activity performed with a given account is compared against prior digital activities performed with the given account that have been identified as unusual to some degree. Moreover, each digital activity performed with the given account could be compared against prior digital activities performed with related accounts (e.g., corresponding to other platforms) that have been identified as unusual to some degree.

The analysis module 110 may be responsible for considering whether different combinations of digital activities are indicative of a security threat. For example, the scoring module may perform functions associated with secondary analyzer 350. For example, the analysis module 110 may determine, based on the scores produced by the scoring module 108, whether a digital activity is individually indicative of a security threat or collectively—with at least one other digital activity—indicative of a security threat. Assume, for example, that the scores produced by the scoring module 108 are representative of deviation values, indicating the degree to which each corresponding digital activity deviates from past digital activities performed on the same platform with that account. These deviation values can be supplied to the analysis module 110, and the analysis module 110 may input these deviation values into a rules-based engine, heuristics-based engine, or model that predicts the likelihood of a security threat.

The remediation module 112 may perform one or more remediation actions in response to the analysis module 110 determining that an account may be compromised. The remediation action(s) may be based on the nature of the threat, the policies implemented by the enterprise, etc. These policies may be predefined or dynamically generated based on inference, analysis, or the data obtained by the threat detection platform 100 (e.g., from the enterprise network 116 or developer 118). Examples of remediation actions include moving communications generated by a compromised account into a hidden folder (also referred to as a "quarantine folder") for further analysis, prohibiting a compromised account from accessing sensitive information, sending notifications (e.g., to the actual employee, enterprise, or member of the security service), resetting the password of the compromised account, ending all active sessions of the compromised account, and resetting connections with services/databases accessible via the enterprise network 116.

The reporting module 114 may be responsible for reporting insights derived from the outputs that are produced by the scoring module 108. For example, the reporting module 114 may provide a summary of the threats discovered through analysis of the outputs produced by the scoring module 108 to an electronic device 120. The electronic device 120 may be managed by the employee associated with the account under examination, an individual associated with the enterprise (e.g., a member of the IT department), or an individual associated with a security service. The reporting module 114 can surface insights into threats in a human-readable format for display on an interface accessible via the electronic device 120.

As shown in FIG. 1, the threat detection platform 100 may also include a training module 104 that operates to train the models employed by the other modules. For example, the training module 104 may train the models applied by the scoring module 108 to the sign-in data, message data, email data, or mail filter data by feeding training data into those models. The training data could include emails that have been labeled as malicious or non-malicious, policies related to attributes of emails (e.g., specifying that emails originating from certain domains should not be considered malicious), etc. The training data may be employee- or enterprise-specific so that the model(s) are able to perform personalized analysis. In some embodiments, the training data ingested by the model(s) includes emails that are known to be representative of malicious emails sent as part of an attack campaign. These emails may have been labeled as much during a training process, or these emails may have been labeled as much by other employees.

Moreover, the training module 104 may implement a retraining pipeline (or simply "pipeline") in order to protect against novel threats as further discussed below. At a high level, the pipeline may be presentative of a series of steps that, when executed by the training module 104, cause the models employed by the scoring module 108 to be retrained. By consistently training the models using up-to-date information, the threat detection platform 100 can protect against novel threats that would otherwise escape detection.

Figure 2:
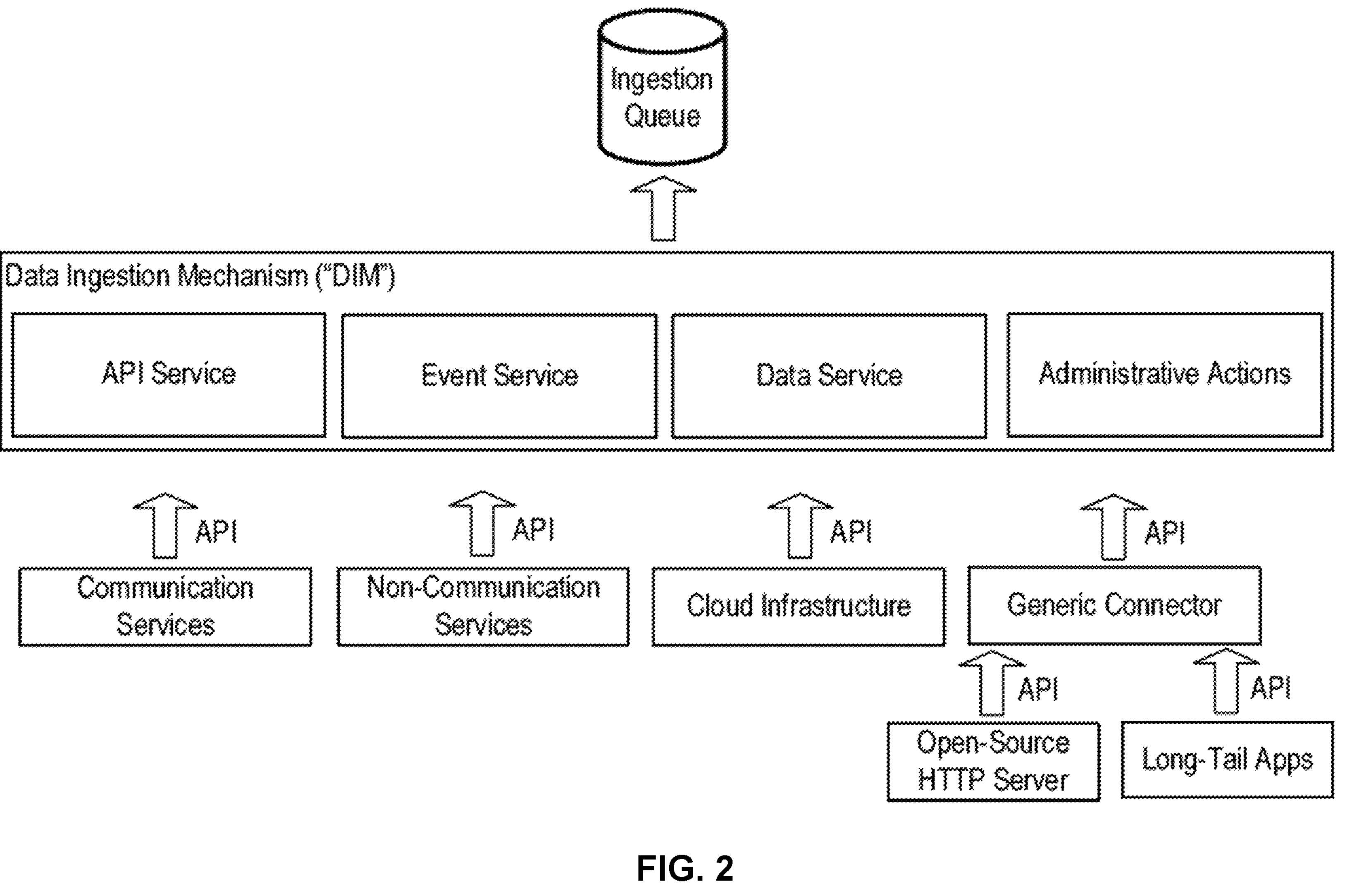
FIG. 2 is a block diagram illustrating an embodiment of a system for creating an event queue from events associated with various platforms.

FIG. 2 is a block diagram illustrating an embodiment of a system for creating an event queue from events associated with various platforms. This example includes a high-level illustration of the architecture of a data ingestion mechanism ("DIM") that could be implemented in the threat detection platform. As shown in this example, the DIM may support one or more APIs via which data can be ingested from various sources. Here, for example, the DIM supports APIs via which data can be acquired from SaaS services (e.g., those offered by Microsoft, Google, Salesforce, Workday, ServiceNow, Oracle, etc.) and cloud infrastructures (e.g., Google Cloud Platform, Amazon Web Services, and Microsoft Azure). In some embodiments, the DIM supports an API that serves as a generic data interface via which data can be provided to the threat detection platform in nearly any form, whether structured or unstructured. Via this API, data can be acquired from an open-source Hypertext Transfer Protocol ("HTTP") server, on-premises computer programs (also called "long-tail computer programs" or "long-tail applications"), and the like. Because this "generic API" can serve as a connection mechanism between the threat detection platform and sources of data, it may also be called a "generic connection mechanism" or "generic connector." Each API supported or accessed by the DIM may include—or interface with—a standardization mechanism that allows the data ingested from a corresponding service to be more readily handled by the various modules of the threat detection platform.

Figure 3:
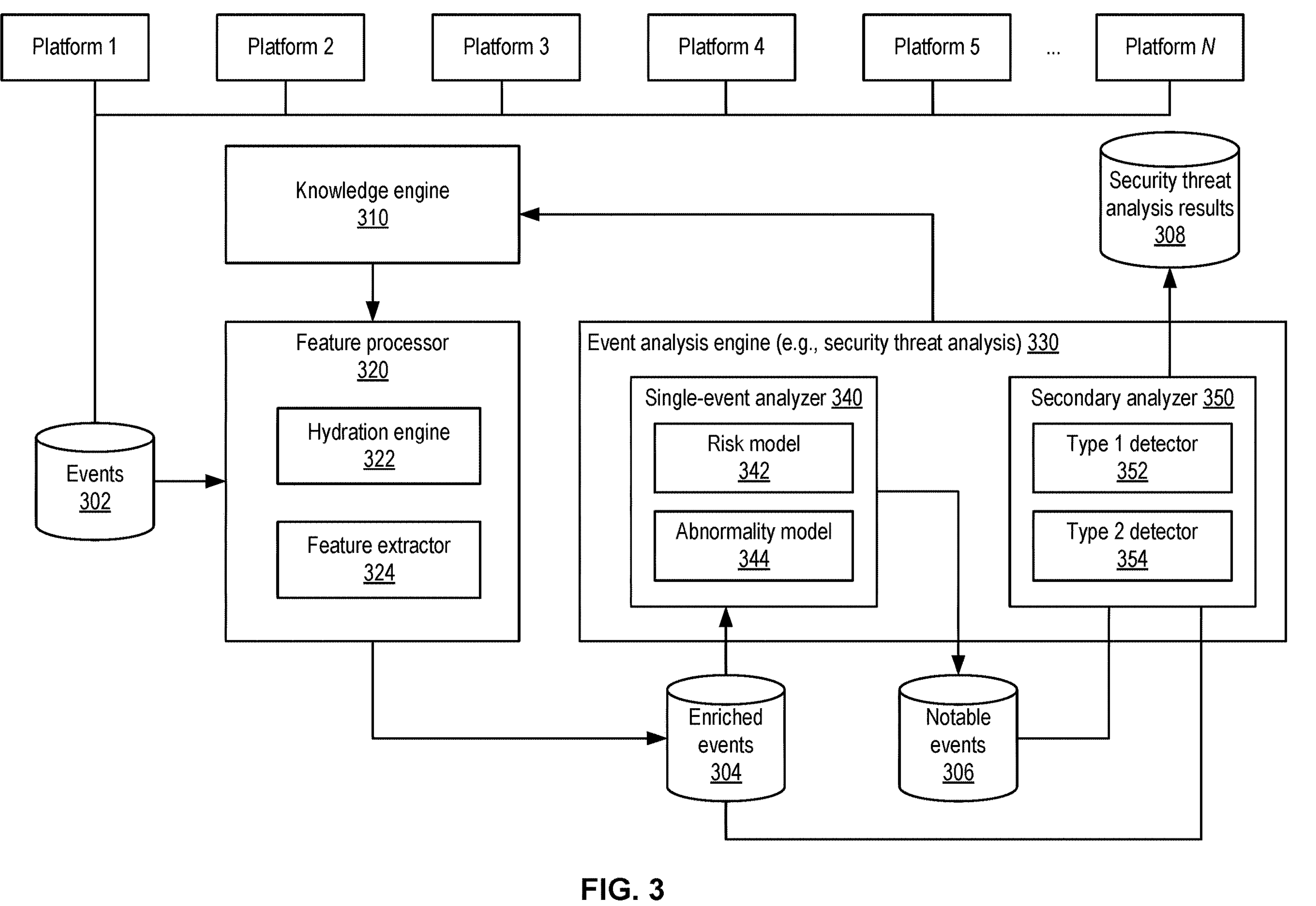
FIG. 3 is a block diagram illustrating an embodiment of a system for security threat detection using independent abnormality analysis and risk analysis.

FIG. 3 is a block diagram illustrating an embodiment of a system for security threat detection using independent abnormality analysis and risk analysis. The system includes a knowledge engine 310, feature processor 320, and event analysis engine 330. Events or results may be stored in store 302, 304, 306, and 308. Although depicted as separate storage devices for different types of events or results, the storage may instead be implemented by one or more storage devices. For example, events and enriched events may be stored in a single storage device.

Events 302 may be stored in a queue (sometimes referred to as an "ingestion queue"), and the events may be obtained from one or more digital service platforms (Platform 1 through Platform N as shown).

Knowledge engine 310 applies domain knowledge or internal threat intelligence (such as rules or patterns) to filter events and determine whether to further process events. The knowledge engine is sometimes referred to as an event filtering layer because it determines whether an event is possibly notable. In some experiments it has been observed that over 99% of events are benign and therefore likely not notable. Benign events do not need to be further analyzed. The knowledge engine may receive on the order of billions of events per month and output only those events that are notable for further processing.

Feature processor 320 creates features from events. In various embodiments, the feature processor includes a hydration engine 322 and a feature extractor 324. The hydration engine 322 hydrates or enriches features with additional information. Examples of additional information include, without limitation:

- People base data such as user-level information (similar to the information described with respect to the user profile) from various sources including third party platforms such as Microsoft Azure Active Directory® or Microsoft Active Directory®.
- Network base data, which may be externally sourced. For example, an IP quality score is a score based on attributes for a particular IP address. Open source (or other) lists may include IP ranges having specific characteristics.
- Internally maintained behavioral aggregates/counts. The aggregates may be keyed by user, company, IP address or global. An example of an aggregate keyed by a user is how frequently a user uses a particular application, which may be stored across various time ranges such as a few hours or several days. In other words, at the user level, for each attribute, it is known how often that attribute holds true for that user over different time ranges. It could be how often a particular user is using a particular application, browser, operating system, address, etc. An example of an aggregate keyed by company is how often anyone in a particular company logs in from a particular location. An example of an aggregate keyed by IP address is how often sign-ins have been observed from a particular IP address from any company registered device ID. An example of a global aggregate is how often an IP address sign-in has been observed from a known benign application.
- Internal threat intelligence data, which may be based on internal domain knowledge or assessments such as true positive cases from observed past events or patterns. For example, certain attributes may be considered to be benign or malignant. For example, certain IP addresses may be on a blacklist. As another example, certain internet service providers (ISPs), or virtual private network (VPN) usage patterns are benign or malignant.

The feature extractor 324 receives notable events (e.g., as identified by the knowledge engine 310) and associated enriched features from hydration engine 322, converts information from hydration into one or more machine learning model features, and outputs features that are consumable by the machine learning models. Rules may be applied to add insight to the features. In various embodiments, if there are on the order of hundreds of attributes that get hydrated, there may be on the order of thousands of features that are produced based on those attributes. For example, the hydration layer may produce counts of various attributes, but it is unknown how many times they occur together.

The feature extraction layer performs a derivation such as time and location of a previous event with time and place of a current event. The time difference, speed of travel, and distance may be computed. These computed attributes may be compared with aggregate statistics from the hydration step to derive additional attributes. For example, any anomalous time difference, speed of travel, or distance may indicate a notable event if it is statistically unlikely that a second login event can occur after a first login event, because the locations are too far apart given the time of login. Another example is determining that an OS for a current event is a first type of OS. This type of OS is compared with the previous N attributes to determine whether this OS is unique or common for the particular user.

In various embodiments, features that are determined by feature processor 320 are stored in enriched events store 304. The stored features may be accessed by the event analysis engine 330.

Figure 4:
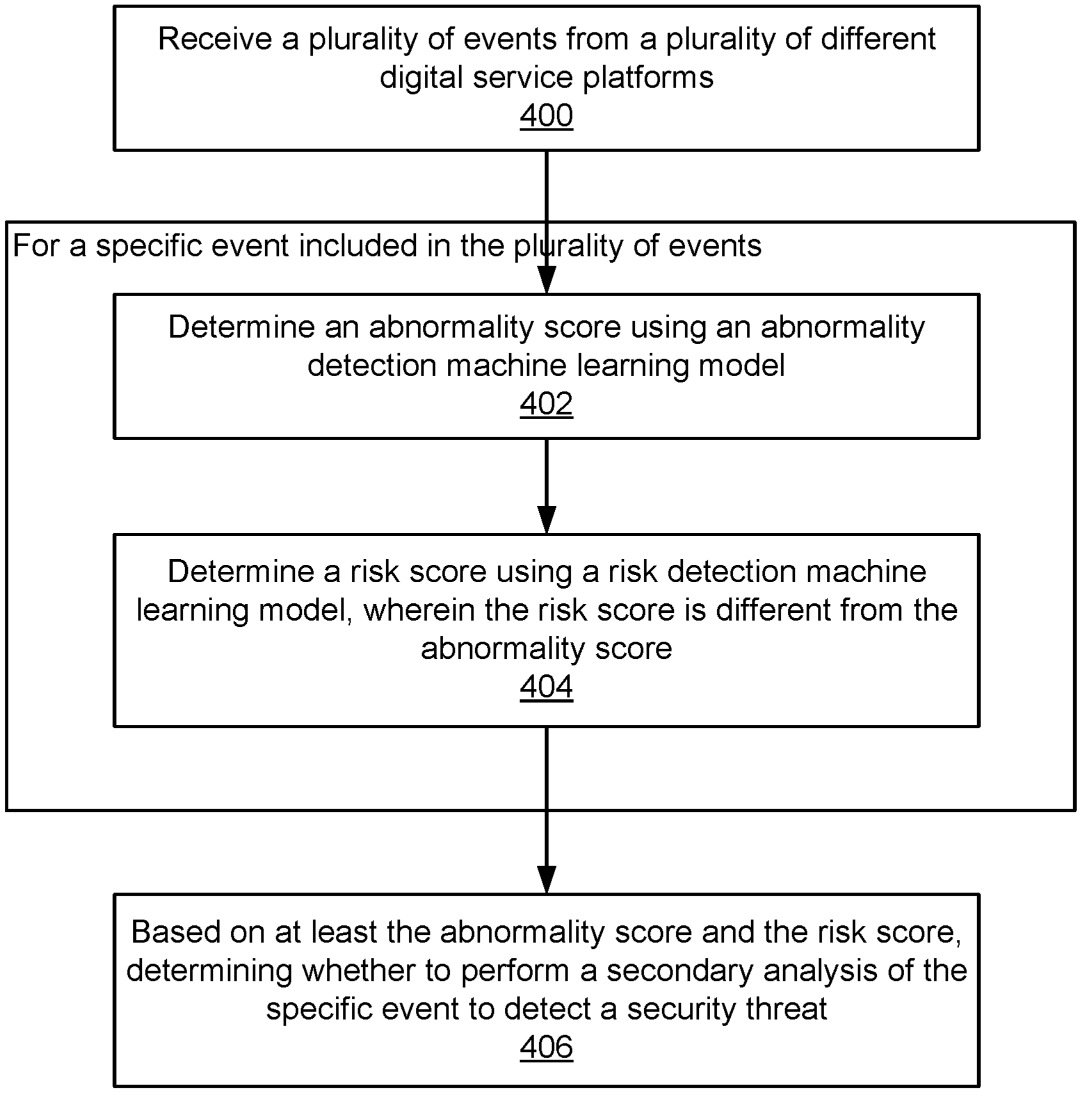
FIG. 4 is a flow diagram illustrating an embodiment of a process for security threat detection using independent abnormality analysis and risk analysis.
Figure 5:
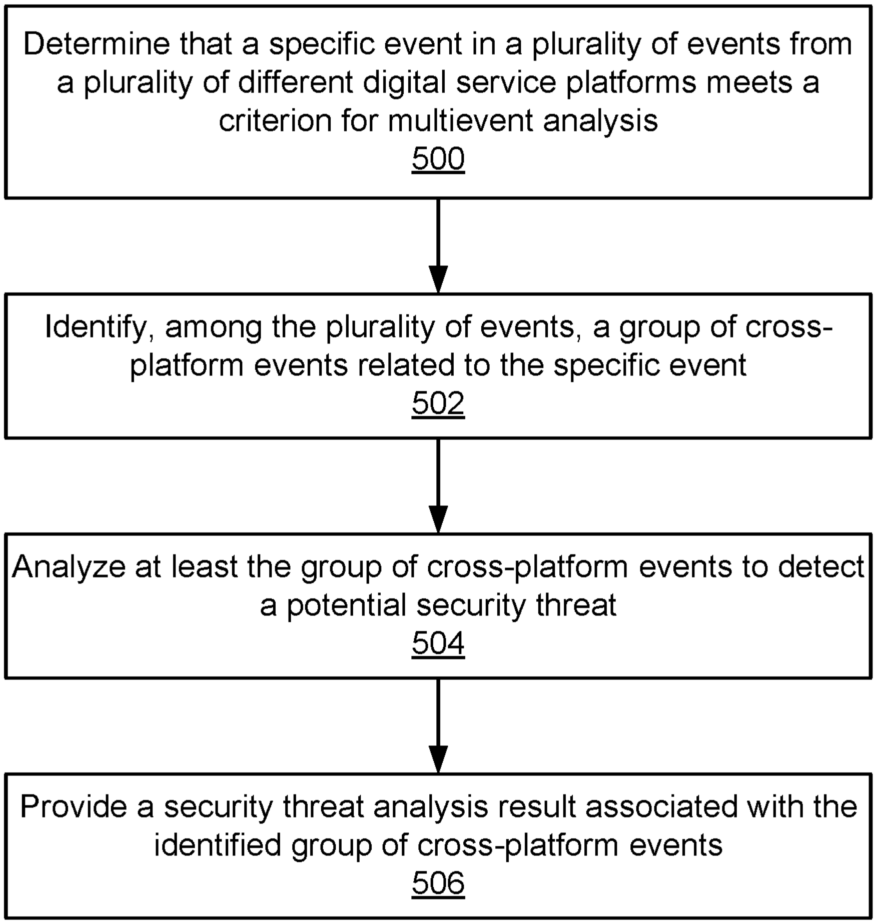
FIG. 5 is a flow diagram illustrating an embodiment of a process for cross-platform security threat detection.
Figure 6:
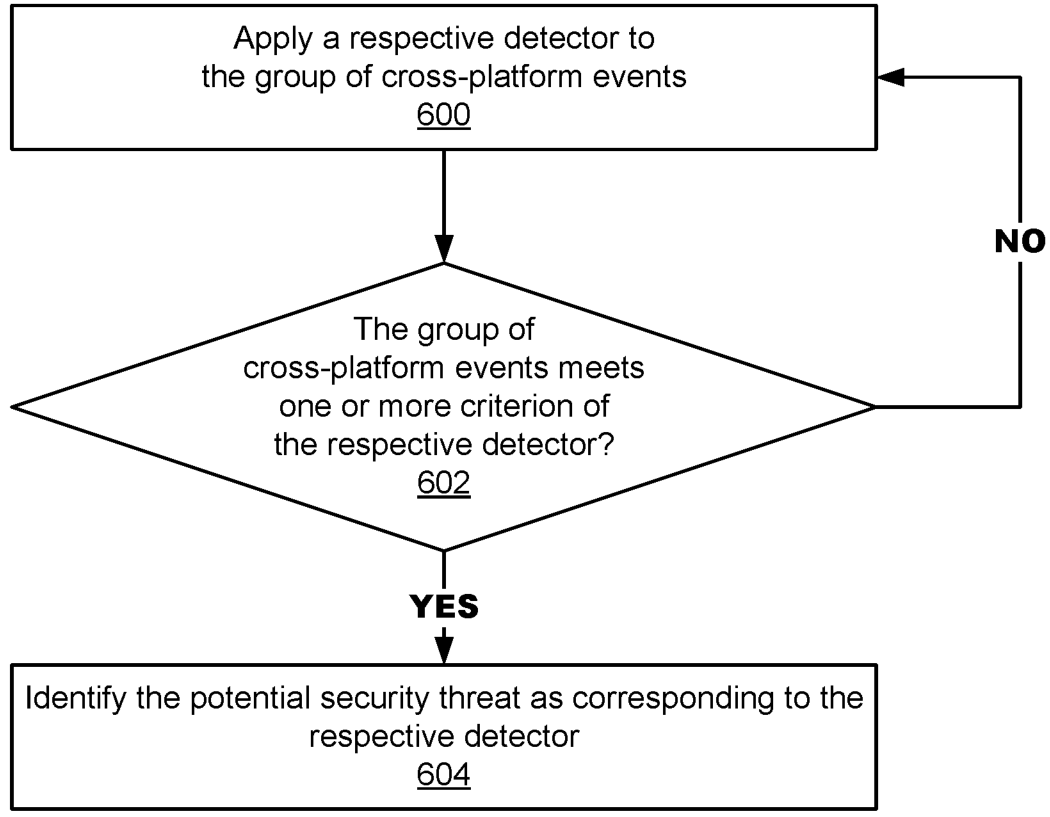
FIG. 6 is a flow diagram illustrating an embodiment of a process for analyzing a group of cross-platform events to detect a potential security threat.

Event analysis engine 330 performs security threat analysis such as the processes of FIGS. 4-6. In this example, the event analysis engine includes a single-event analyzer 340 and a secondary analyzer 350.

The single-event analyzer 340 includes one or more machine learning models. Examples of models include a risk model 342 and an abnormality model 344. The abnormality model determines events that are abnormal, meaning that they are unusual for a particular user of a company. The risk model determines events that are risky, meaning that they resemble previously seen attacks. An abnormal event is not necessarily risky and vice versa. Conventionally, abnormality and risk are conflated and not individually determined/determinable. By determining abnormality and risk separately, improved results may be obtained. Each of the models may be implemented using machine learning, e.g., a supervised machine learning model.

Risk model 342 receives a feature and outputs a risk score. The risk model predicts/determines events that are risky, meaning they resemble previously seen attacks and quantifies the risk in the risk score. This model may be based on various features derived from heuristics that capture known attack patterns such as impossible travel, suspicious location, IPQS fraud score, etc. In various embodiments, input features include (high cardinality) categorical features such as an IP quality score (e.g., provided by a third party such as IPQS ASN), location (e.g., as identified by a third party), and/or a cloud application name. In some embodiments, rather than using the categorical features, the features include aggregates (e.g., bucketing) of categorical features that track their distributions over attacks vs. benign examples. Using aggregates of features rather than the high cardinality categorical features themselves uses fewer computing resources. For example, a model can learn patterns across training examples of any ISP with similar distributions across malicious vs. benign examples rather than learning for a specific ISP. As further described herein, the features may be enriched or derived such as based on attributes previously observed to have been involved in attacks. An example of a derived attribute is a version downgrade pattern in which a user uses a more recent version of an operating system (or the like) and suddenly switches to an older version of the operating system, VPNs that are inherently risky, IP addresses that are inherently risky.

Abnormality model 344 receives a feature and outputs an abnormality score. The abnormality model predicts/determines events that are abnormal, meaning they are unusual for a particular entity (e.g., user or company) and quantifies the abnormality in the abnormality score. In various embodiments, the model uses RSA frequency features computed using entity-level (e.g., user-level and company-level) statistics. Time spans for frequency features may include various spans such as 1 day, 4 days, 7 days, 30 days, 90 days, or the like. Certain assumptions may also be made to avoid false positives. For example, in the example of detecting abnormal sign-in events, if fewer than 15 sign-ins are observed for a particular user in the past 30 days, then frequency statistics are likely too skewed to extract high fidelity signals so sign-in events are not flagged as abnormal. The abnormality model considers features across timelines, attributes, and various levels to granularity to determine whether a particular behavior is abnormal or not. Similar to the risk model, features for the abnormality model may be enriched and/or derived. For example, logic may determine if an IP address is a VPN, whether an IP address belongs to a particular company (or datacenter within a company), etc.

In various embodiments, the risk model and abnormality model are implemented by separate machine learning models because each is configured to perform a different task. For example, if a user is a new user, there are typically no baselines. The first 10 sign-ins all appear abnormal because more data is expected to be able to determine what is normal vs. abnormal for a particular user. On the other hand, by the fifth sign-in the risk model is able to determine whether the event is risky based on global data.

The secondary analyzer 350 performs multi-event analysis by receiving one or more notable events and outputting a security threat analysis result. The secondary analyzer 350 includes one or more detectors. In this example, the detectors include a type 1 detector 352 and a type 2 detector 354. This is merely exemplary and not intended to be limiting as a different number of detectors may be provided. Each detector is configured to detect a respective type of potential security threat. For example, a first detector detects MFA bypass, while another detector detects credential stuffing. The detectors may be operated in sequence or in parallel.

In various embodiments, multi-event analysis is complex and more computationally expensive to perform. For example, an underlying ML model may be more computationally expensive to run. The disclosed techniques improve the functioning of a computer performing security threat detection because available resources are used more efficiently. Instead of performing multi-event analysis for all events, only those events identified to be notable (e.g., via the single event analysis described herein) are processed using multi-event analysis. The results are both more accurate and more efficiently obtained.

In operation, one or more events 302 are obtained from one or more digital service platforms. The events are processed by knowledge engine 310 and feature processor 320 to identify enriched events 304 and features. An event analysis engine 330 performs single-event analysis 340 using a risk model 342 and an abnormality model 344. Each model determines a respective score associated with a given event. The abnormality score and the risk score each indicates whether an event is notable. One or more thresholds may be used to determine whether to further analyze an event as further described herein with respect to 500. Notable events may be further processed by secondary analyzer 350, which includes various detectors to detect different types of potential security threats by assessing a group of cross-platform events. Security threat analysis results 308 may be stored and/or presented on a user interface.

This system may be included in another system such as the system of FIG. 1. For example, events 302 may be obtained from monitoring module 106 and/or enterprise network 116 and developer 118, analysis module 110 is an example of abnormality model 344, scoring module 108 is an example of risk model 342. Reporting module 114 may report security threat analysis results 308.

FIG. 4 is a flow diagram illustrating an embodiment of a process for security threat detection using independent abnormality analysis and risk analysis. This process may be implemented on or by the system of FIG. 3 or processor 1202 of FIG. 12.

In the example shown, the process begins by receiving a plurality of events from a plurality of different digital service platforms (400). As described herein, an "event" refers to an occurrence at a particular time such as user-associated events such as sign-ins, mail filter creation, security alerts, sending an email, integration events (which may be reported by a third party), and internal events (which may be based on internal intelligence).

In various embodiments, at least one event of the plurality of events is standardized, enriched, and/or used to extract features prior to subsequent processing. Because the events may be received from different digital service platforms, they may be in different formats. In various embodiments, the process standardizes at least one event of the received plurality of events to a common format. Different platforms might use different names for the same field, and the fields are identified to be referring to the same field. For example, a look-up table may be used to identify that the name for a particular field used by a first platform maps to a common fieldname. Similarly, a name for a particular field used by a second platform maps to the same common field name. This allows two different names to be identified to be mapped to a common field/format.

The common format may be associated with a sign-in event, the sign-in event including at least one of: one or more repeated clients, one or more repeated actors, one or more repeated targets, or an authentication context. The common format is associated with a user profile, the user profile including at least one of: address, native platform identifier (ID), name, job title, department, location, phone number, permission, or access level. The common format is associated with at least one of: a message event, a mail filter, a risk event, or an internal email message. In summary, common formats include, without limitation:

Sign-in event, which identifies aspects of a sign-in such as repeated clients, repeated actors, repeated targets, or authentication context.

User profile, which identifies aspects of a particular user such as one or more email addresses, native platform ID, name, job title, department, location such as home or office address, phone number such as home or office number, manager's email, permissions, access level, and/or administrative role. Another example of user profile data is profile data stored by a third-party platform such as Microsoft Azure Active Directory® or Microsoft Active Directory®.

Message event such as an internal notification that there is suspicious activity observed based on texts, emails, or the like. For example, an internal observation engine or team may notice that a user is sending out phishing emails and create a message event.

Internal email message such as emails sent to company internal recipients from internal senders. For example, a burst refers to an attempt by a user to send numerous (e.g., on the order of hundreds) emails.

Mail filter or posture events such as configuration changes to an application, user-created filters on a mail client, or the like.

Risk event such as security alerts or incidents identified by the various digital service platforms.

In various embodiments, the process enriches at least one event of the received plurality of events including by adding additional information to the at least one event. The added additional information of the enriched at least one event may include at least: a user-level information, a network quality score, or a count.

In various embodiments, the process determines at least one feature based at least in part on the plurality of events. The at least one feature is based at least in part on a comparison of at least one of: a time between two events or a distance between the two events. Examples of feature enrichment and extractions are further described with respect to 320.

Each enriched event may be analyzed to individually determine a risk score and/or an anomaly score as further described herein. In various embodiments, event level filters are applied to determine whether to further analyze a particular event. For example, one or more rules are applied to determine whether an event is benign. An event that is benign is not further processed. One or more features are extracted from each enriched event. Features are consumable by machine learning models to make predictions as follows.

For a specific event included in the plurality of events, the process determines an abnormality score using an abnormality detection machine learning model (402). The process also determines a risk score using a risk detection machine learning model, wherein the risk score is different from the abnormality score (404).

In various embodiments, the risk detection machine learning model is configured to determine events based at least in part on previously detected security threats. The risk detection machine learning model is trained at least in part using one or more of the following: a likelihood of a characteristic of an event appearing based at least in part on known patterns or aggregates/counts of categorical features.

The risk score may be determined using a trained abnormality machine learning model as further described with respect to 342. Risk refers to a determination of how likely a signal is malicious given known (e.g., global) information. Riskiness signals may include, without limitation:

Intuition. For example, for most North America based companies that do not have a division office or forbid travel to a particular geography, a sign-in from the particular geography is likely malicious.

Internal threat intelligence based on observations or analytics. For example, an IP that is frequently involved in ATOs or phishing attacks.

External threat intelligence such as IPQS data set.

User threat intelligence, which may be provided by users/companies.

An example feature used includes how often a characteristic or event property has been seen in past attacks. Another example feature is the likelihood of seeing a characteristic or event property in attacks based on known patterns.

In various embodiments, the abnormality detection machine learning model is configured to determine events that are unusual for a particular entity. The abnormality detection machine learning model may be trained at least in part using a frequency aggregate of how often a characteristic of an event has appeared previously.

The abnormality score may be determined using a trained abnormality machine learning model as further described with respect to 344. Abnormality refers to a determination of how unusual behavior is for a given entity such as a particular user or company. An example feature used includes a frequency aggregate of how often something has been seen in the past.

In various embodiments, the abnormality model and the risk model are both invoked. Heuristics and/or rules may be applied on top of the scores produced by each of the models to arrive at a decision of whether to proceed to the next analysis step (e.g., perform secondary analysis).

The process determines whether to perform a secondary analysis of the specific event to detect a security threat based on at least the abnormality score and the risk score (406). In various embodiments, the process determines whether to perform the secondary analysis of the specific event to detect the security threat including by determining to perform the secondary analysis in response to the specific event being determined to be not benign. As another example, the process determines to perform the secondary analysis in response to at least one of: a determination that the abnormality score meets an abnormality threshold, a determination that the risk score meets a risk threshold, or a determination that a combination of the abnormality score and the risk score meets a combined threshold. An example of secondary analysis is multi-event analysis shown in FIG. 5.

FIG. 5 is a flow diagram illustrating an embodiment of a process for cross-platform security threat detection. This process may be implemented on or by system 300 of FIG. 3 or processor 1202 of FIG. 12.

The process begins by determining that a specific event in a plurality of events from a plurality of different digital service platforms meets a criterion for multievent analysis (500). As described herein, criteria for multievent analysis (sometimes referred to as "secondary analysis") includes comparing an abnormality score and/or a risk score associated with the specific event against a threshold. For example, an abnormality threshold may be applied to the abnormality score, a risk threshold may be applied to the risk score, and/or a combined threshold may be applied to the combined abnormality and risk scores.

The process identifies, among the plurality of events, a group of cross-platform events related to the specific event (502). Considering multiple events together may increase confidence. For example, a notable sign-in event combined with an MFA device registration event for the same user may indicate that there has been an attack with a high level of confidence compared with either event happening alone. Similarly, notable events that occur across different applications or platforms may indicate that there has been an attack with a high level of confidence compared with an event that happens only on a single platform.

In various embodiments, the group of cross-platform events includes at least one event associated with a first platform and at least one event associated with a second platform. Cross-platform events overcome some of the limitations of considering only a single platform. For example, some applications have a relatively low volume of sign-ins. Generating behavioral profiles for users from those applications alone is difficult. By considering events across platforms for a particular user, it is easier to build an accurate behavioral profile. For example, certain applications such as email or messaging may have high volumes of activity. This improves case detection accuracy.

The group of events may be related by at least one of: being associated with a particular user, being a notable event, or being associated with a particular entity/company/group. Identifying the group of cross-platform events related to the specific event includes filtering events to determine a subset of notable events that are relevant to the specific event. Events may be filtered to determine that they are related to the specific event. Filtering identifies a subset of (notable) events that are relevant to the specific event. Example filtering criteria include but are not limited to: time (e.g., recency), internet protocol (IP) address, or type. For example, based on the nature of the risk, it is known that for this type of risk event, other types of events should be included as relevant events.

In various embodiments, anything that is interesting or worth noting is already a notable event (e.g., by performing single-event analysis such as the process shown in FIG. 4), and all of that data is indexed. This allows a current/specific event (referred to as the "anchor") to be accessed as well as notable events in the past (e.g. stored in notable events 306). The process can anchor based on the nature of notable events, which other events might be relevant, and then group that subset to form a group of related events. By considering related events, it may be determined whether the related events form a "case" or not. A "case" refers to a potential security threat. The case may be escalated or given visibility by displaying it on a user interface, sending a notification to an administrator, or the like.

The process analyzes at least the group of cross-platform events to detect a potential security threat (504). In various embodiments, analyzing at least the group of cross-platform events to detect the potential security threat includes using at least one detector to detect the potential security threat. Referring briefly to FIG. 3, example detectors are detectors 352 and 354. Each of (at least a subset of) the at least one detector is configured to detect a respective type of potential security threat. For example, detector 352 detects a first type of potential security threat while detector 354 detects a second type of potential security threat.

In various embodiments, the at least one detector utilizes rule-based pattern analysis. Relevant or related events are identified and used for a rule-based pattern analysis for specific types of threats that are to be surfaced to an end-user. One or more detectors may be used to detect various types of security threats. The detectors may be based on heuristics, rules, or patterns.

Using the example of an account takeover (ATO) as a security threat, all ATOs fall into one of two categories: at least N sign-ins observed a user within R time span and an abnormal and risky sign-in occurs; fewer than N sign-ins are observed for a user in the past R time span and a risky sign-in occurs. Values for N and R may be selected based on various observations. By way of non-limiting example, values are N=15 and R=30 days. In other words, the first category refers to: at least a first number of sign-ins are observed for a user within a time span, at least one sign-in exceeds an abnormal score, and at least one sign-in exceeds a risk score. The second category refers to: fewer than the first number of sign-ins are observed for the user within the time span, and at least one sign-in exceeds a risk score.

The process provides a security threat analysis result associated with the identified group of cross-platform events (506). In various embodiments, the security threat analysis result includes a history of specific events associated with the detection of the potential security threat. For example, the result may include a history that led to a decision that a case is worthy of further investigation. Examples of user interfaces are further described with respect to FIGS. 7-11. In various embodiments, at least a portion of the security threat analysis result may be made visible to a user. At least a portion of the security threat analysis result may be hidden from the user. For example, cases may be stored in a log rather than displayed on a user interface. That is, at least a portion of the security threat analysis result may be logged without presenting the security threat analysis result on a user interface.

Suppose a specific single event is a mail filter. Related events may include sign-in events that were determined to be notable. By analyzing the related events together, this indicates that there was a particular sequence of sign-in events that happened. After those sign-ins, suppose there was an audit log event indicating that some permissions were changed, following by the current event, which is creating the mail filter. This may indicate that while in isolation, the mail filter might not be suspicious, the sequence indicates that this case is a potential security threat worthy of surfacing to the customer.

In various embodiments, the process includes providing a user interface including the security threat analysis result. Some examples of user interfaces are shown in FIGS. 7-11.

FIG. 6 is a flow diagram illustrating an embodiment of a process for analyzing a group of cross-platform events to detect a potential security threat. This process may be performed as part of another process such as 504 of FIG. 5. This process may be implemented on or by system 300 of FIG. 3 or processor 1202 of FIG. 12.

The process begins by applying a respective detector to a group of cross-platform events (600). Referring briefly to FIG. 3, examples of detectors include 352 and 354. A detector may be implemented using heuristics, rules, or machine learning. By way of non-limiting example, detectors include:

MFA bypass: determined based on the MFA setting for past J notable events. If above a threshold number of those J events used saved credentials and the current event involves an incorrectly entered password, this could be surfaced to an end-user as worthy of further investigation.

Credential stuffing.

Abnormal and risky sign-ins: at least N sign-ins observed a user within R time span and an abnormal and risky sign-in occurs. In various embodiments, these events are not surfaced to an end-user and instead logged. A subset of these events may be surfaced to an end-user as follows.

High precision abnormal and risky sign-ins: a subset of events flagged by the abnormal and risky sign-ins detector to be surfaced to an end-user. The subset of events fulfills one or more of the following criterion:
- Abnormality score exceeding a threshold value different from the abnormal threshold (e.g., the threshold value is 50% higher than the abnormal threshold indicating that this is more abnormal than the average abnormal event)
- Risk score exceeding a threshold (e.g., the threshold value is 20% higher than the risk threshold indicating that this is riskier than the average risky event)
- IP address of sign-in event does not belong to a data center ISP.

Low volume risky sign-ins: heuristic filters that are applied to fewer than N sign-ins are observed for a user in the past R time span.

By way of non-limiting example, heuristics include:
- Benign cloud application per IP
- Failed sign-ins, e.g., distinct ASNs seen across past X failed or successful sign-ins
- Presence of risk events (e.g., anonymous IP)
- User clicks on an email, the email being judged to be malicious (e.g., by knowledge engine such as 310 of FIG. 3)
- Cross-entity/company/platform signals to identify which IP addresses are VPNs being cycled between multiple users vs. IP addresses that are attackers attempting to compromise accounts across multiple companies
- User was recipient of a phishing email The process determines whether the group of cross-platform events meets one or more criterion of the respective detector (602).

If the group of cross-platform events meets one or more criterion of the respective detector, the process proceeds to identify the potential security threat as corresponding to the respective detector (604). Otherwise, the process returns to 600 to apply another detector to the group of cross-platform events. Although depicted as being sequential, one or more detectors may instead be applied at least in parallel.

In various embodiments, the process includes determining a confidence score associated with the security threat analysis result. In this regard, flagging an event may be performed using several detectors, some of which may be more precise than others. If a first detector is more precise than a second detector, then there is greater confidence when the first detector flags an event vs. when a second detector flags the event. Confidence may be a score or categorized such as "low," "medium," and "high." The confidence information may be helpful downstream, e.g., to perform auto-remediation only when the confidence is high or deciding whether to display information in a user interface.

In various embodiments, the confidence of an event is determined by extracting a signature, and then mapping the signature to a confidence level. For example, a signature may be computed by analyzing a current event along with one or more past events. A set of all flagging detectors from the triggering and past events may be formed. An example is as follows:

- triggering event:
  - flagged L3 detectors: [RULE_GROUP_SKIP_REVIEW, MAIL_FILTER_HIDDEN_NAME]
  - flagged L4 detectors: [ ]
- past events:
  - past event 1:
    - flagged L3 detectors: [SIGNIN_DETECTOR_RISKINESS_MODEL, SIGNIN_DETECTOR_ABNORMALITY_MODEL]
    - flagged L4 detectors: [ABNORMAL_AND_RISKY_SIGNINS]
  - past event 2:
    - flagged L3 detectors: [MANY_PREVIOUS_COUNTRIES_DETECTOR]
    - flagged L4 detectors: [OTHER_USE_CASE]
  - past event 3:
    - flagged L3 detectors: [SIGNIN_DETECTOR_RISKINESS_MODEL, SIGNIN_DETECTOR_ABNORMALITY_MODEL]
    - flagged L4 detectors: [ABNORMAL_AND_RISKY_SIGNINS, ABNORMAL_AND_RISKY_SIGNINS_HIGH_PRECISION]

This would result in a signature {RULE_GROUP_SKIP_REVIEW, MAIL_FILTER_HIDDEN_NAME, SIGNIN_DETECTOR_ABNORMALITY_MODEL, SIGNIN_DETECTOR_RISKINESS_MODEL, ABNORMAL_AND_RISKY_SIGNINS, MANY_PREVIOUS_COUNTRIES_DETECTOR, OTHER_USE_CASE, ABNORMAL_AND_RISKY_SIGNINS_HIGH_PRECISION}

In various embodiments, the signature may be implemented as a set or a counter. The signature is mapped to a confidence level. For example, a dataset that maps signatures to confidence scores is maintained and scores are mapped to a confidence level based on meeting a threshold. For example, the dataset holds only scores for medium and high confidence signatures, and those signatures that do not meet the ones in the dataset are low confidence.

Since there may be several detectors, it is possible that there is an intractable number of signatures. This may be addressed by selecting the subset of the signature that has the highest confidence. For example:

1. Signature: {MANY_PREVIOUS_COUNTRIES_DETECTOR, OTHER_USE_CASE, SIGNIN_DETECTOR_ABNORMALITY_MODEL, IOC, SIGNIN_DETECTOR_RISKINESS_MODEL, LATERAL_PHISHING}. Subsets in the dataset:
   1. {MANY_PREVIOUS_COUNTRIES_DETECTOR, OTHER_USE_CASE, SIGNIN_DETECTOR_ABNORMALITY_MODEL} → High Confidence
   2. {SIGNIN_DETECTOR_RISKINESS_MODEL, SIGNIN_DETECTOR_ABNORMALITY_MODEL} → Medium Confidence
   3. Select High Confidence
2. Signature: {MANY_PREVIOUS_COUNTRIES_DETECTOR, OTHER_USE_CASE, IOC, SIGNIN_DETECTOR_ABNORMALITY_MODEL, LATERAL_PHISHING}. Subsets in the dataset:
   1. {SIGNIN_DETECTOR_RISKINESS_MODEL, SIGNIN_DETECTOR_ABNORMALITY_MODEL} → Medium Confidence
   2. Select Medium Confidence The confidence may be displayed in a user interface as further described with respect to FIG. 9. Details for a specific type of threat may be shown in a variety of ways. The following figures show some examples of user interfaces.

Figure 7:
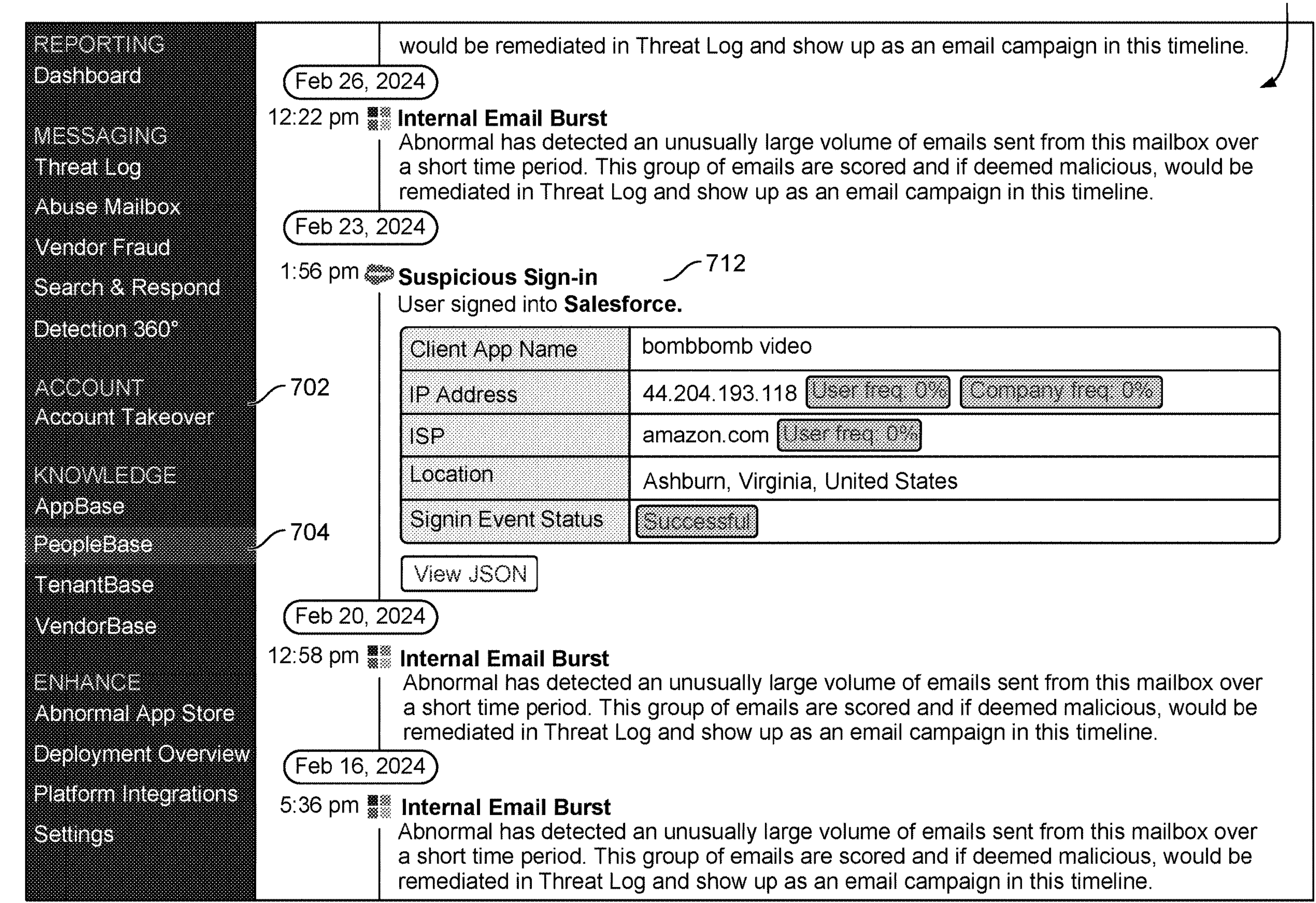
FIG. 7 illustrates an example of a user interface including a notable events timeline for displaying a security threat analysis result obtained in some embodiments.

FIG. 7 illustrates an example of a user interface including a notable events timeline for displaying a security threat analysis result obtained in some embodiments. The notable events timeline includes notable events, which may or may not form a case. This user interface can be displayed per user. For example, here, the user interface is accessed via PeopleBase 704. This user interface is sometimes referred to as an event card portal view. Each use case dynamically maps to a different textual description for what happened and why a particular event was chosen to be suspicious.

The user interface includes an event card for each event in a group of events associated with the potential security threat. A card is populated dynamically at a case level. For example, dynamically generated text indicates how the events come together to make a particular case, e.g., an account takeover case. There may be one or more tags for classifications made with respect to the events.

Section 710 shows a timeline including several events. In this example, there are four visible events:

12:22 pm Internal Email Burst
1:56 pm Suspicious Sign-in
12:58 pm Internal Email Burst
5:36 pm Internal Email Burst The events may be of various types and/or obtained from different digital service platforms. In this example, each event shows a corresponding associated source platform denoted by a symbol of that platform.

The event card includes a dynamically generated reason for why the event is included in the group of events. For example, each event is displayed with a dynamically generated text description of why that event was chosen for inclusion in the timeline. Then, within that event, there is a subset of all attributes. Referring to event 712, the attributes displayed are: Client App Name, IP Address, ISP, Location, and Signin Event Status. As described herein, initially there may be numerous attributes (e.g., on the order of thousands). A subset of those attributes most salient for the determination that the event is notable are determined for display. A threshold may be set to define how many attributes to display. In this example, four to six attributes are selected for display. Although not shown here, for at least one of the attributes, there may be a mark of whether the attribute is abnormal or risky. An example of marked attributes is shown for event 1102 in FIG. 11. The determination of whether an attribute is abnormal or risky may be dynamically determined and labeled, e.g., based on scoring of detectors described with respect to 504.

In various embodiments, separate timelines may be displayed for different types of attacks. Selecting 702 causes a user interface such as the one shown in the next figure to be displayed.

Figure 8:
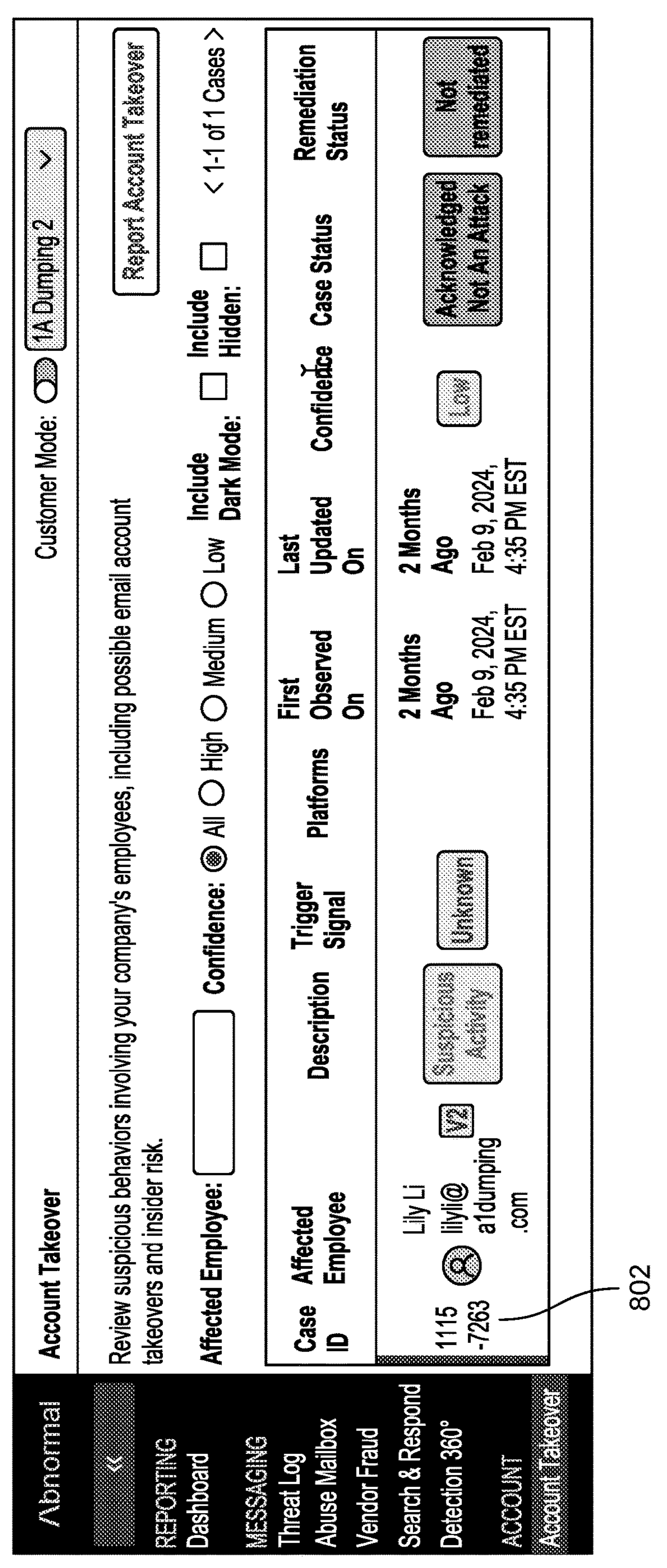
FIG. 8 illustrates an example of a user interface including potential security threat detection by type in some embodiments.

FIG. 8 illustrates an example of a user interface including potential security threat detection by type in some embodiments. In this example, the detected security threat type is an account takeover (ATO). One or more cases (here, account take over) are displayed. In various embodiments, a single case is displayed per user. However, this is merely exemplary and not intended to be limiting as more than one case may be displayed for a particular user. Selecting 802 causes a user interface such as the one shown in the next figure to be displayed.

Figure 9:
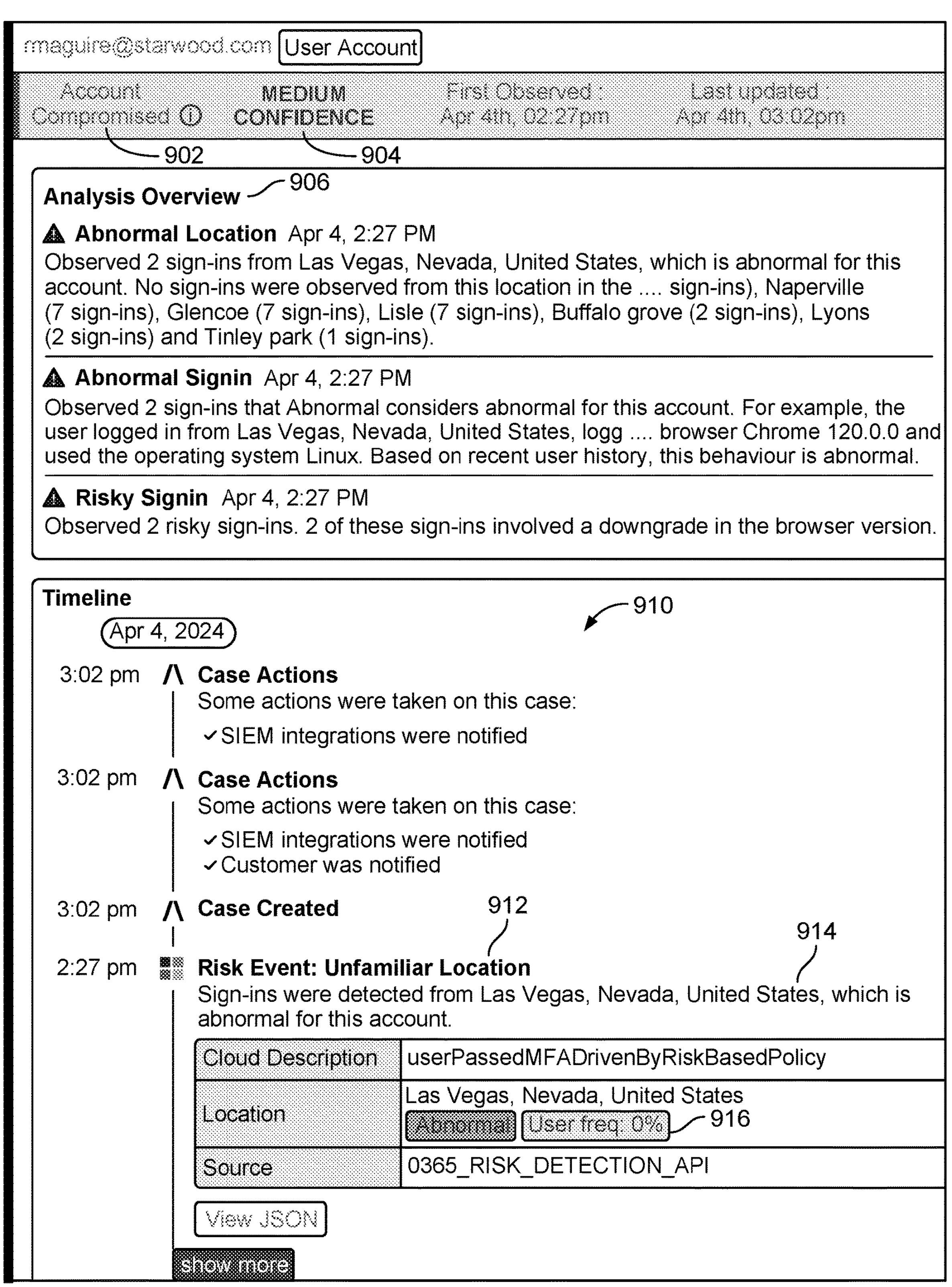
FIG. 9 illustrates an example of a user interface including a timeline with cards for displaying a security threat analysis result obtained in some embodiments.

FIG. 9 illustrates an example of a user interface including a timeline with cards for displaying a security threat analysis result obtained in some embodiments. Each of the components are like their counterparts in FIG. 7 unless otherwise described. Unlike the notable events timeline of FIG. 7, the user interface here shows a case. In this example, the case 902 is an account takeover.

The user interface specifies a confidence associated with the security threat analysis result. For example, a confidence level 904 is displayed. The confidence may be a score, band, or other indication of the confidence of the assessment that the events form in this case. Confidence may be determined in a variety of ways as further described herein.

The user interface includes an automatically generated narrative associated with the detection of the potential security threat. The user interface may include a set of events associated with the automatically generated narrative. The set of events may be a subset of the plurality of events from the plurality of different digital service platforms meeting the criterion for the multievent analysis. An example of the narrative is an analysis overview 906.

The analysis overview 906 includes a narrative or explanation of the current case. For example, here the description explains why this particular user's mailbox is compromised. The analysis overview may be determined by logic and heuristics. For example, based on the number of risky sign-ins and suspicious sign-ins observed, a narrative is determined to explain the pattern of behavior. In this example, the analysis overview describes observing sign-ins from abnormal locations as well as risky sign-ins. Another example of an analysis overview is that first there was a suspicious sign-in from a particular location, which is abnormal, followed by creating a mail filter to hide their identity.

In this example, the analysis overview includes three components (each with a red alert triangle). Whether a pattern reaches a threshold or meriting an individual triangle depends on detector activity described herein. Those events selected to be added to the description associated with a particular analysis overview component are based on those features that trigger the detectors to mark an event as abnormal or risky. A threshold can be used so that a limited number of events is displayed without creating too much text or content.

Similar to the example of FIG. 7, notable events are displayed in timeline 910, which may be obtained from different types of events or different platforms. In various embodiments, the events that are displayed are a subset of all the events from the notable events timeline (e.g., FIG. 7) determined to meet the narrative 906 for this case being an account takeover. For example, suppose a case is opened and subsequently there are hundreds of sign-ins. Not all of the sign-ins would be displayed. Only those contributing to the narrative would be displayed in the timeline. The one or more criterion leading to the creation of the case is also responsible for the adaptation of the timeline.

The timeline may include actions taken to resolve or further analyze the case. For example, via a remediation module 112, actions may be taken. An example of an action are the first three items in the timeline. Upon creation of the case, some downstream actions may be created. Although not shown, if a customer interacts with a case, then those are also events that may be displayed in the timeline along with the customer's comments.

The timeline may include one or more events 912. Each event includes a description 914, which may be dynamically generated or updated. Various attributes of the events may be displayed in a way similar to FIG. 7, in which a subset (e.g., the most salient) of all attributes are displayed. Aggregate statistics may be related to a specific attribute, and the attribute may be identified as risky or abnormal. For example, the location attribute includes a user frequency tag 916. User frequency may be based on aggregate statistics such as aggregates/counts described herein.

In various embodiments, an event that is initially not considered notable can later become notable because later it is determined that there is a high likelihood of an ATO attack. For example, those events might not be added retroactively to the timeline but cases may be created to include those events. For example, if for a particular user, an IP address was determined to be malicious, then that IP address would cause notable events and cases to be created for any user from any organization with that IP address.

In various embodiments, a timeline does not have an end date and can be loaded with events as a user scrolls. In various embodiments, if a user does not interact with the case, the case continues to be updated. Referring to the example in which there is a suspicious sign-in from an abnormal location followed by a mail filter, suppose that subsequently it was observed in audit log activity that a new MFA device was registered for the account. The audit log activity information would cause the analysis overview to be updated and the timeline to be updated. Typically, as more data is observed, the confidence increases. For example, riskier sign-ins increase confidence that there is a potential security threat. As another example, risky sign-ins followed by benign events increase the confidence that there is not a potential security threat.

FIG. 10 illustrates an example of a user interface including a user profile associated with a security threat analysis result obtained in some embodiments. Information associated with a particular user may be displayed. In various embodiments, the timeline is displayed on a left side of a user interface, which the user profile shown here is displayed on the right side. The information in the user profile may be dynamically determined or updated. For example, the information is relevant to a timeline, which is displayed alongside the user profile. Depending on the use case, information may be shown in a different sequence in the order of relevance. In this example, the geography/location is more relevant than operating system and browsers so location information is displayed ahead of the other information.

Figure 11:
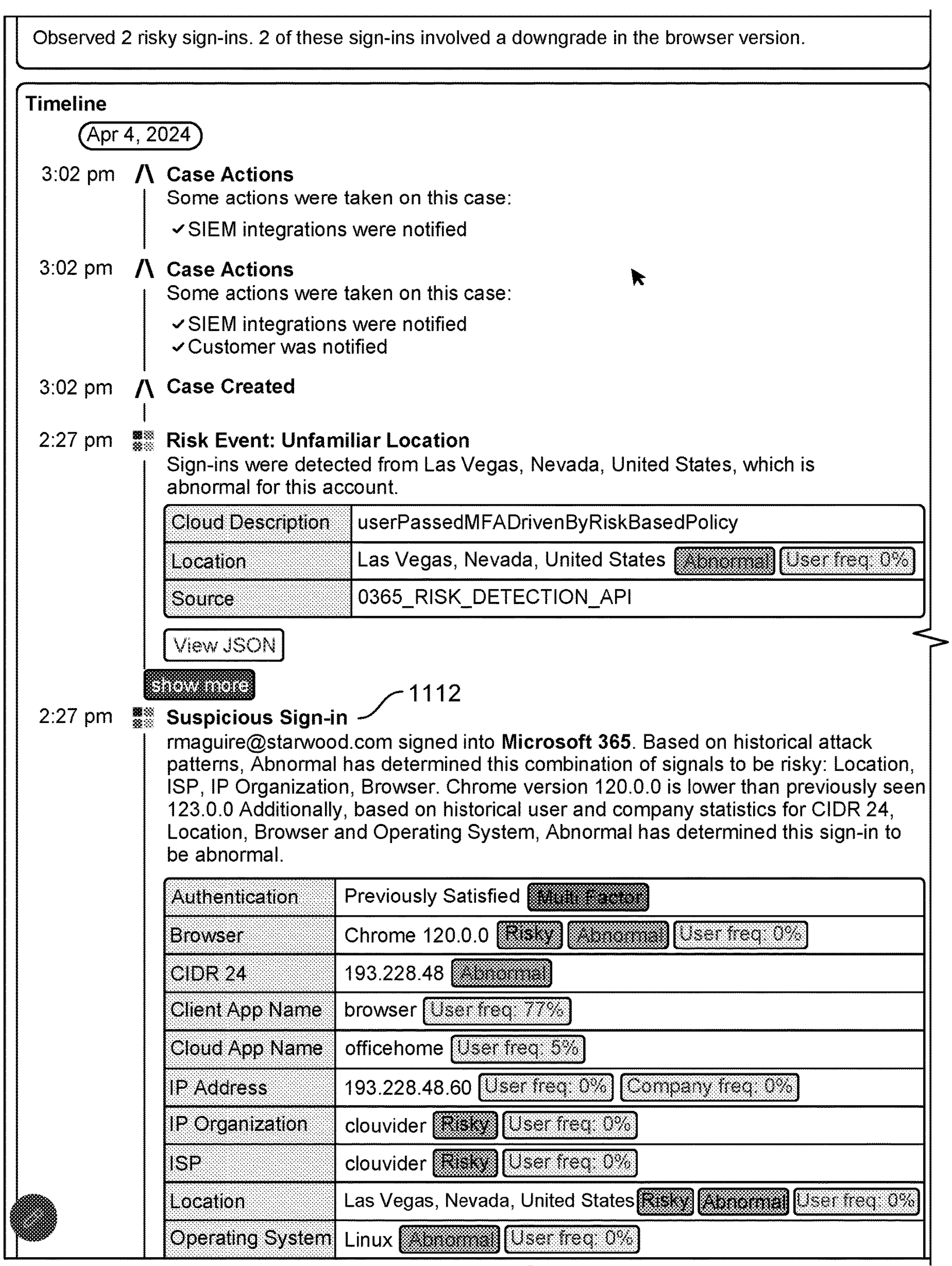
FIG. 11 illustrates an example of a user interface including a notable events timeline for displaying a security threat analysis result obtained in some embodiments.

FIG. 11 illustrates an example of a user interface including a notable events timeline for displaying a security threat analysis result obtained in some embodiments. Each of the components are like their counterparts in FIG. 7 unless otherwise described. In this example, a suspicious sign-in event 1112 is shown along with associated attributes. The attributes also include tags indicating whether the respective attribute is risky and/or abnormal.

Figure 12:
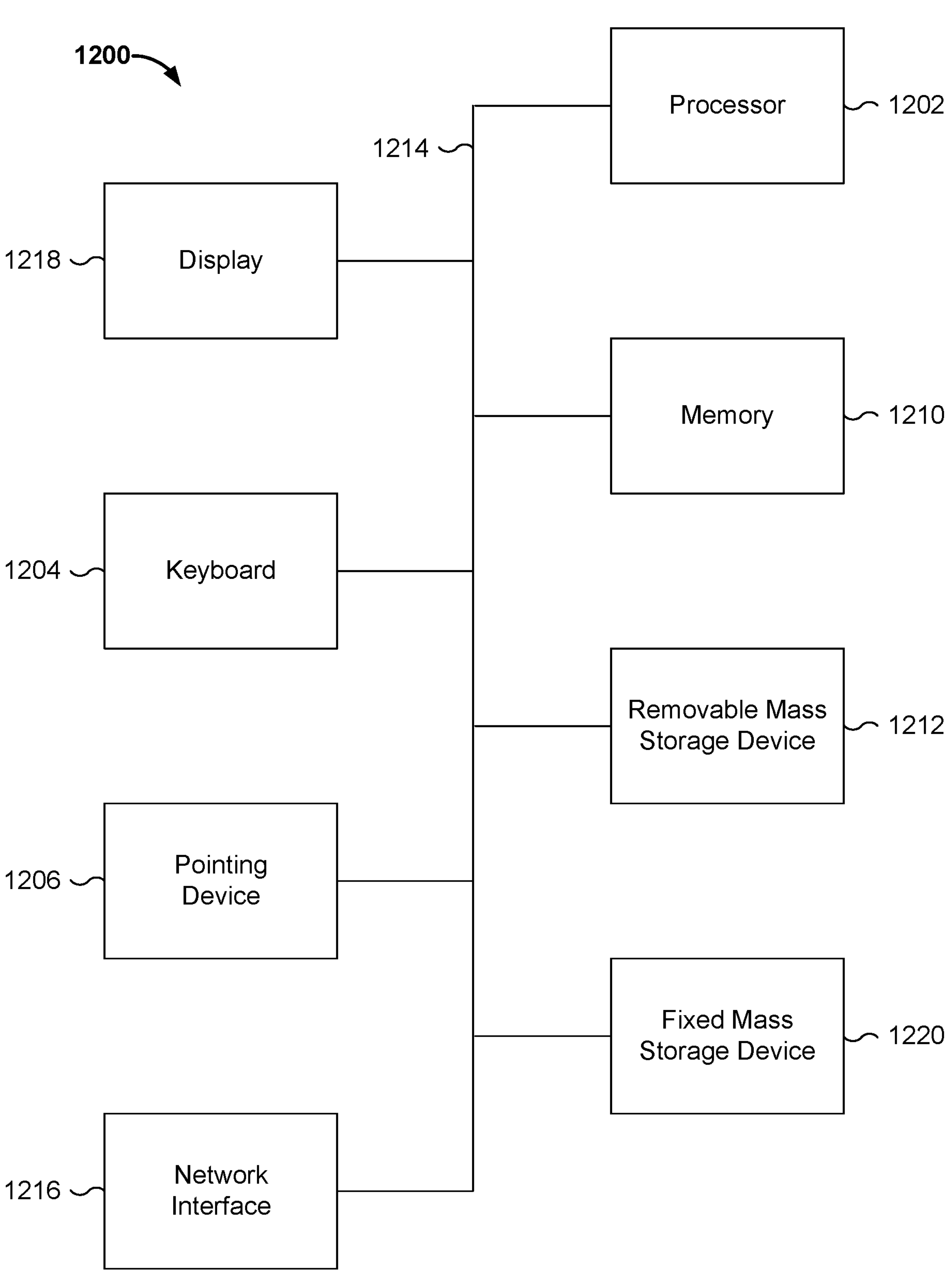
FIG. 12 is a functional diagram illustrating a programmed computer system for performing security threat detection in accordance with some embodiments.

FIG. 12 is a functional diagram illustrating a programmed computer system for performing security threat detection in accordance with some embodiments. As will be apparent, other computer system architectures and configurations can be used to perform security threat detection. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general-purpose digital processor that controls the operation of the computer system 1200. Using instructions retrieved from memory 1210, the processor 1202 controls the reception and manipulation of input data, and the output and display of data on output devices (e.g., display 1218). In some embodiments, processor 1202 includes and/or is used to provide a user interface described with respect to FIGS. 7-11 and/or execute/perform the processes described with respect to FIGS. 4-6.

Processor 1202 is coupled bi-directionally with memory 1210, which can include a first primary storage, typically a random-access memory (RAM), and a second primary storage area, typically a read-only memory (ROM). As is well known in the art, primary storage can be used as a general storage area and as scratchpad memory, and can also be used to store input data and processed data. Primary storage can also store programming instructions and data, in the form of data objects and text objects, in addition to other data and instructions for processes operating on processor 1202. Also, as is well known in the art, primary storage typically includes basic operating instructions, program code, data and objects used by the processor 1202 to perform its functions (e.g., programmed instructions). For example, memory 1210 can include any suitable computer-readable storage media, described below, depending on whether, for example, data access needs to be bi-directional or uni-directional. For example, processor 1202 can also directly and very rapidly retrieve and store frequently needed data in a cache memory (not shown).

A removable mass storage device 1212 provides additional data storage capacity for the computer system 1200, and is coupled either bi-directionally (read/write) or uni-directionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storage 1212, 1220 generally store additional programming instructions, data, and the like that typically are not in active use by the processor 1202. It will be appreciated that the information retained within mass storage 1212 and 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

determining that a specific event in a plurality of events from a plurality of different digital service platforms meets a criterion for multievent analysis;

identifying, among the plurality of events, a group of cross-platform events related to the specific event;

analyzing at least the group of cross-platform events to detect a potential security threat; and providing a security threat analysis result associated with the identified group of cross-platform events, wherein providing the security threat analysis result includes generating a user interface comprising an automatically generated narrative associated with the detection of the potential security threat, the automatically generated narrative is generated based on an abnormality score and a risk score determined for the specific event, the abnormality score is determined independently from the risk score using an abnormality detection machine learning model configured to identify behavior that is unusual for a particular entity, and the risk score is determined using a risk detection machine learning model configured to identify behavior resembling previously seen attack patterns for a plurality of entities.

2. The method of claim 1, wherein the group of cross-platform events includes at least one event associated with a first platform and at least one event associated with a second platform.

3. The method of claim 1, wherein events included in the group of cross-platform events related to the specific event are related by at least one of: being associated with a particular user, being a notable event, or being associated with a particular entity.

4. The method of claim 1, wherein identifying the group of cross-platform events related to the specific event includes filtering events to determine a subset of notable events that are relevant to the specific event.

5. The method of claim 4, wherein the filtering is based at least on a similarity between the specific event and other events in the group of cross-platform events with respect to at least one of: time, internet protocol (IP) address, or type.

6. The method of claim 1, wherein analyzing at least the group of cross-platform events to detect the potential security threat includes using at least one detector to detect the potential security threat.

7. The method of claim 6, wherein each of at least a subset of the at least one detector is configured to detect a respective type of potential security threat.

8. The method of claim 6, wherein the at least one detector utilizes rule-based pattern analysis.

9. The method of claim 6, wherein the at least one detector detects the potential security threat in response to at least one of:

at least a first number of sign-ins are observed for a user within a time span, at least one sign-in exceeds an abnormal score, and at least one sign-in exceeds a risk score; or fewer than the first number of sign-ins are observed for the user within the time span, and at least one sign-in exceeds a risk score.

10. The method of claim 1, further comprising determining a confidence score associated with the security threat analysis result.

11. The method of claim 1, wherein the security threat analysis result includes a history of specific events associated with the detection of the potential security threat.

12. The method of claim 1, wherein at least a portion of the security threat analysis result is logged without presenting the security threat analysis result on a user interface.

13. The method of claim 1, wherein:

the user interface includes an event card for each event in a group of events associated with the potential security threat; and the event card includes a dynamically generated reason for why a respective event is included in the group of events.

14. The method of claim 1, wherein:

the user interface includes a set of events associated with the automatically generated narrative; and the set of events is a subset of the plurality of events from the plurality of different digital service platforms meeting the criterion for the multievent analysis.

15. The method of claim 1, wherein the user interface specifies a confidence associated with the security threat analysis result.

16. A system, comprising:

a processor configured to:

determine that a specific event in a plurality of events from a plurality of different digital service platforms meets a criterion for multievent analysis;

identify, among the plurality of events, a group of cross-platform events related to the specific event;

analyze at least the group of cross-platform events to detect a potential security threat; and provide a security threat analysis result associated with the identified group of cross-platform events, wherein providing the security threat analysis result includes generating a user interface comprising an automatically generated narrative associated with the detection of the potential security threat, the automatically generated narrative is generated based on an abnormality score and a risk score determined for the specific event, the abnormality score is determined independently from the risk score using an abnormality detection machine learning model configured to identify behavior that is unusual for a particular entity, and the risk score is determined using a risk detection machine learning model configured to identify behavior resembling previously seen attack patterns for a plurality of entities; and a memory coupled to the processor and configured to provide the processor with instructions.

17. The system of claim 16, wherein analyzing at least the group of cross-platform events to detect the potential security threat includes using at least one detector to detect the potential security threat.

18. The system of claim 16, wherein events included in the group of cross-platform events related to the specific event are related by at least one of: being associated with a particular user, being a notable event, or being associated with a particular entity.

19. The system of claim 16, wherein identifying the group of cross-platform events related to the specific event includes filtering events to determine a subset of notable events that are relevant to the specific event.

20. A computer program product embodied in a non-transitory computer readable medium and comprising computer instructions for:

determining that a specific event in a plurality of events from a plurality of different digital service platforms meets a criterion for multievent analysis;

identifying, among the plurality of events, a group of cross-platform events related to the specific event;

analyzing at least the group of cross-platform events to detect a potential security threat; and providing a security threat analysis result associated with the identified group of cross-platform events, wherein providing the security threat analysis result includes generating a user interface comprising an automatically generated narrative associated with the detection of the potential security threat, the automatically generated narrative is generated based on an abnormality score and a risk score determined for the specific event, the abnormality score is determined independently from the risk score using an abnormality detection machine learning model configured to identify behavior that is unusual for a particular entity, and the risk score is determined using a risk detection machine learning model configured to identify behavior resembling previously seen attack patterns for a plurality of entities.

* * * * *